(12) United States Patent
Lowery et al.

(10) Patent No.: US 6,882,772 B1
(45) Date of Patent: Apr. 19, 2005

(54) OPTICAL DEVICE FOR DISPERSION COMPENSATION

(75) Inventors: Arthur James Lowery, Kew (AU); Phillip Clyde Roberts Gurney, Thornbury (AU)

(73) Assignee: The University of Melbourne, Parkville (AU)

( * ) Notice: Subject to any disclaimer, the term of this patent is extended or adjusted under 35 U.S.C. 154(b) by 0 days.

(21) Appl. No.: 09/623,416

(22) PCT Filed: Mar. 2, 1999

(86) PCT No.: PCT/AU99/00127

§ 371 (c)(1),
(2), (4) Date: Dec. 12, 2000

(87) PCT Pub. No.: WO99/45420

PCT Pub. Date: Sep. 10, 1999

(30) Foreign Application Priority Data

Mar. 2, 1998 (AU) .............................................. PP2083

(51) Int. Cl.[7] .............................. G02B 6/26; G02B 6/28
(52) U.S. Cl. .............................. 385/27; 385/14; 385/15; 385/24; 385/37; 385/132
(58) Field of Search .............................. 385/24, 27, 28, 385/31, 37, 46, 14, 15, 129–132; 359/124, 173; 398/81

(56) References Cited

U.S. PATENT DOCUMENTS

| 4,750,802 A | * | 6/1988 | Bhagavatula | ............ 350/96.15 |
| 5,136,671 A | * | 8/1992 | Dragone | ...................... 385/46 |
| 5,473,719 A | * | 12/1995 | Stone | ......................... 385/123 |
| 5,522,004 A | | 5/1996 | Djupsjobacka et al. | |

FOREIGN PATENT DOCUMENTS

| JP | 5-346515 A | 12/1993 |
| JP | 09133826 A | 11/1995 |
| JP | 7-333447 A | 12/1995 |
| WO | WO 95/22070 A1 | 8/1995 |
| WO | WO98/35459 A1 | 8/1998 |

OTHER PUBLICATIONS

Zirngible et al., "Demonstration of a Splitter/Router Based on a Chirped Waveguide Grating Router," IEEE: Photonics Technology Letters, 10(1):87–89 (1998).

Agrawal, G.P., *Fiber–Optic Communication Systems*, 1997, pp. 6–13, John Wiley & Sons, Inc., New York.

* cited by examiner

*Primary Examiner*—Brian Healy
*Assistant Examiner*—Michael P. Mooney
(74) *Attorney, Agent, or Firm*—Dorsey & Whitney LLP

(57) ABSTRACT

An optical device (2) having a number of waveguides (12), an input port (6) coupled to the waveguides (12) such that light incident on the input port (6) is split for propagation on the waveguides, and an output port (10) receiving light propagated on the waveguides (12) at a point on an output plane of incidence. The waveguides (12) induce respective delays in the propagated light to induce a wavelength dependent group delay. Delays between adjacent waveguides are chosen to be non-constant, to introduce quadratic, cubic or higher-order phase differences between different waveguides. Applications include dispersion compensation, pulse compression, and passband broadening in arrayed waveguide grating multiplexers and demultiplexers.

21 Claims, 3 Drawing Sheets

OPTICAL DEVICE FOR DISPERSION COMPENSATION

The present invention relates to an optical device and, in particular, an optical device which can be used for dispersion compensation in optical communications systems.

Transmission or light propagation distances over optical fibre links are limited by two factors, signal loss and fibre dispersion. Dispersion in an optical fibre is primarily due to the different propagation speeds of light of different wavelengths. Without compensation, fibre dispersion spreads optical signals in time, and can cause energy to transfer from one bit in a digital communications system, to adjacent bits. This ultimately reduces the difference between 'one' and 'zero' bits, making it difficult for the receiver to reach a decision on whether a 'one' or a 'zero' was transmitted, which causes errors and thus limits transmission length. In analog systems, dispersion leads to phase errors and nulls in the baseband response of an optical fibre link.

Dispersion compensation can be performed by inserting an optical component in the light wave path which has an equal but opposite differential-group delay characteristic to the preceding optical fibre link.

Dispersion compensating fibre (DCF) has been used to provide compensation. DCF has the opposite dispersion characteristic of normal ('single-mode') fibre, and a very strong dispersion. Thus a short length of dispersion compensating fibre will cancel the dispersion of a normal fibre of several times its length. However the length of DCF required is still detrimental, given the length of links which need to be compensated. For example, compensation of an 80 km link requires about 16 km of DCF, which needs to be wound on a spool. The DCF also has high loss due to its length, which is typically several dB when 80 km of fibre is compensated.

Fibre Bragg gratings have also been used to provide compensation. The gratings are an optical fibre with a periodic index grating written along its core, usually with ultraviolet light. The grating is permanent after writing, and its reflection spectrum can be made to have the opposite dispersion characteristic to normal fibre. Thus, in combination with an optical circulator, to separate the input and reflected signals into two fibres, a dispersion compensator can be formed. Use of the gratings however suffers the disadvantage that an optical circulator is normally required, and only a limited range of types of dispersion can be compensated due to the nature of a grating filter.

In accordance with the present invention there is provided an optical device having:
- a plurality of waveguides;
- an input port coupled to the waveguides so light incident on said input port is split for propagation on said waveguides; and
- an output port receiving light propagated on said waveguides at a point on an output plane of incidence, and outputting said light at said point;
- said waveguides inducing respective delays in the propagated light to induce: a wavelength dependent group delay, from said input port to said output port, in said light at said point.

Advantageously, the waveguides can be configured to delay light of shorter wavelengths inserted on said input port more than light of longer wavelengths inserted on said input port, prior to said light constructively interfering at said point on said output plane of said incidence.

Advantageously, the optical device may comprise an arrayed-waveguide grating (AWG).

The present invention also provides an optical device having:
- a plurality of optical delay lines;
- an input device to couple incident light from at least one input to said optical delay lines; and
- an output device to recombine the signals from the delay lines into at least one output, wherein said delay lines are adapted to substantially compensate for dispersion.

A preferred embodiment of the present invention is hereinafter described, by way of example only, with reference to the accompanying drawings, wherein.

Figure 1:
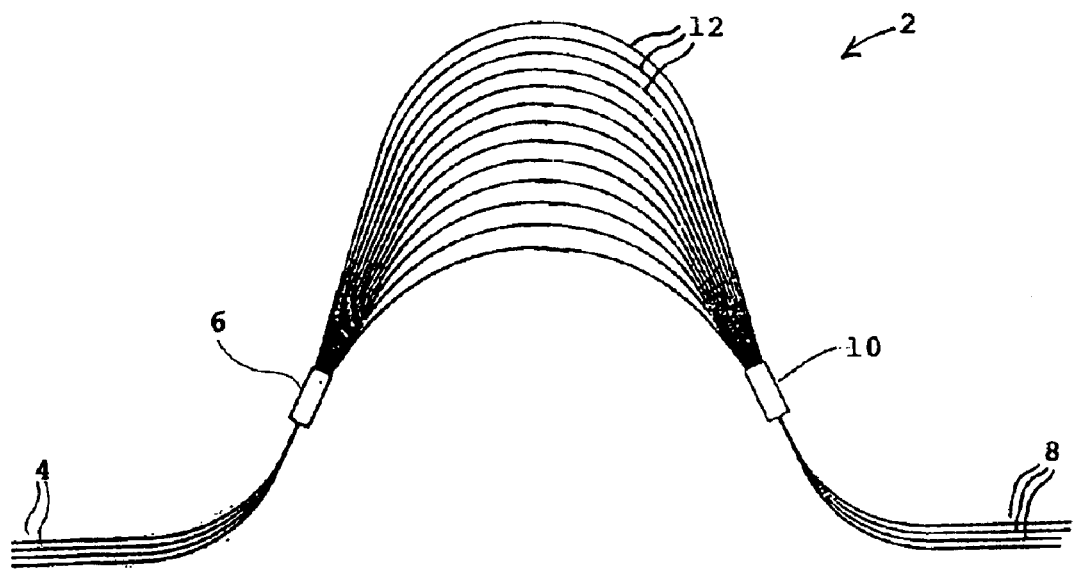
FIG. 1 is a schematic view of a preferred embodiment of an optical dispersion compensating device.

An optical dispersion compensating device 2, as shown in FIG. 1, has a number of input waveguides or lines 4 connected to a coupler 6, a number of output waveguides 8 connected to a recombiner 10, and a plurality of delay lines or waveguides 12 of different lengths L are connected between the coupler 6 and the recombiner 10. The device 2 can be fabricated as an optical integrated circuit with the same basic structure as a circuit known as an arrayed-waveguide grating (AWG), which is also referred to as an arrayed-waveguide grating router or multiplexer (AWGR or AWGM). AWGs are described in Dragone, N., "An N×N optical multiplexer using a planar arrangement of two star couplers", IEEE. Photonics Technol. Letts., 1991, 3, pp.812–815; Takahashi, H., Suzuki, S., Kato, K., and Nishi, N., "Arrayed-waveguide grating for wavelength division multi/demultiplexer with nanometer resolution", Electron. Lett., 1990, 26, pp.87–88; Smit, M. K., "New focusing and dispersive planar component based on an optical phased array", Electron. Lett., 1988, 24, pp.385–386; and U.S. Pat. No. 5,600,742.

Light on the input lines 4 is passed to the coupler 6, which is a free-propagation or multi-mode propagation region that acts as a star coupler, and uses the light it receives to excite the waveguides 12. For a given input line 4, the light on that line is split by the coupler 6 amongst all of the waveguides 12. The recombiner 10 is another free-propagation region which receives the light which propagates on the waveguides 12. The waveguides 12 have different lengths to introduce characteristic delays in the light signals propagated. The recombiner 10 allows those light signals to interfere and produce an interference pattern: on a plane of incidence which corresponds to an input plane for the output lines 8. The inputs for the output lines 8 are located at different points on the plane of incidence so as to output different components of the interfering lights signals in the recombiner 10, i.e. different parts of the interference pattern.

For a standard AWG the waveguides 12 have an incremental increase in length which is constant and linear. The length L of each waveguide 12 is given by:

$$L = L_0 + i\, \Delta L \tag{1}$$

where $L_0$ is a basic optical path length, $\Delta L$ is an optical path length difference, and i=1 to m, where m is the number of delay lines. For a given light input frequency, light on the input lines are coupled to one or more of the output lines. If the wavelength of the light on the input line is swept, the interference pattern produced on the plane of incidence will also sweep across the inputs of the output lines, and the coupling can be calculated using overlap integrals, as described in Smit, M. K. and van Dam, C., "PHASER-based WDM-devices: principles, design and applications", J. Sel. Topics in Quantum Electron., 1996, 2(2), pp.236–250. Standard AWGs can be fabricated such that light of a given wavelength on an input line will constructively interfere at the combiner to produce a peak for output on one of the output lines. If the wavelength changes on that input line, the peak will occur at a different output line. AWGs have the advantage that they are constructed using planar integrated circuit technology, which gives rise to temperature stability and allows for mass production.

The compensation device 2 differs from the standard AWG in that the delay lines 12 are fabricated to introduce additional phase shifts in the propagated light which causes a widening of the passbands for the interference pattern produced in the combiner 10. By introducing a quadratic increase in phase shift between adjacent delay lines 12, the passbands are widened sufficiently that at a given point on the plane of incidence, shorter wavelengths for an input line 4 would have travelled on the longer delay lines, whereas longer wavelengths would have travelled on the shorter delay lines. The device 2 can also be configured so the reverse occurs, if desired. Therefore for one of the output lines 8 different delays would have been experienced by different wavelengths which gives rise to the light from an input line being dispersion compensated. In other words, a wavelength dependent group delay is imparted on the incident light of an input line 4.

Dispersion in an optical link is proportional to $d^2\theta/d^2\lambda$, $\theta$ being the phase and $\lambda$ being the wavelength of the propagated light. Accordingly a quadratic phase shift will reverse this dispersion. A cubic phase shift distorts the shape of the passbands further and can be used to compensate for higher-order dispersion. The phase difference or phase shift between adjacent lines 12 is given by $\Delta\theta=2\pi \Delta L/\lambda$. The difference $\Delta L$ is a constant related to the free spectral range of the device 2. To introduce a quadratic or cubic change in phase with wavelength, this is achieved in the optical device 2 by having optical path lengths given by:

$$L=L_0+i\,\Delta L+i^n k \quad (2)$$

where k and $L_0$ are constants and n is an integer equal to 2 for a quadratic phase shift, 3 for a cubic phase shift, or more for higher-order compensation. Although the lengths of the delay lines 12 are adjusted to introduce the phase shifts, introduction of the phase shifts have relatively small time delays associated with them. Yet it is the time delays introduced which give rise to the wavelength dependent group delay. The same delay differences can be achieved by adjusting other factors associated with the delay lines 12, such as refractive index changes, the introduction of phase-retarding plates and structure changes, and electrical control of index or length. To introduce the required quadratic or higher-order phase shifts the delay T introduced by each line is:

$$T=T_0+i\,T_1+i^n T_n+k_i/f_0 \quad (3)$$

where i=1 to m, n=2 or more and $T_0$, $T_1$ and $T_n$ are fixed delays, where $T_n \ll T_1$. $T_1$, like $\Delta L$, is related to the free spectral range of the device 2. The value $k_i$ is a constant and $f_0$ is the centre frequency of the spectral response of a waveguide 12. The term $k_i/f_0$ simply represents that the addition of integer period delays which will add or subtract multiples of a $2\pi$ phase shift and may not affect operation. The phase shifts introduced are relatively small, being of the order of 0 to $1000\pi$. For example, to introduce a cubic phase shift across the lines 12, the lines may each have a delay:

$$T=T_0+(i-l)T_1+(i-l)^2 T_2+(i-l)^3 T_3 \quad (4)$$

with $T_2$ and $T_3$ being much less than $T_1$.

Figure 2:
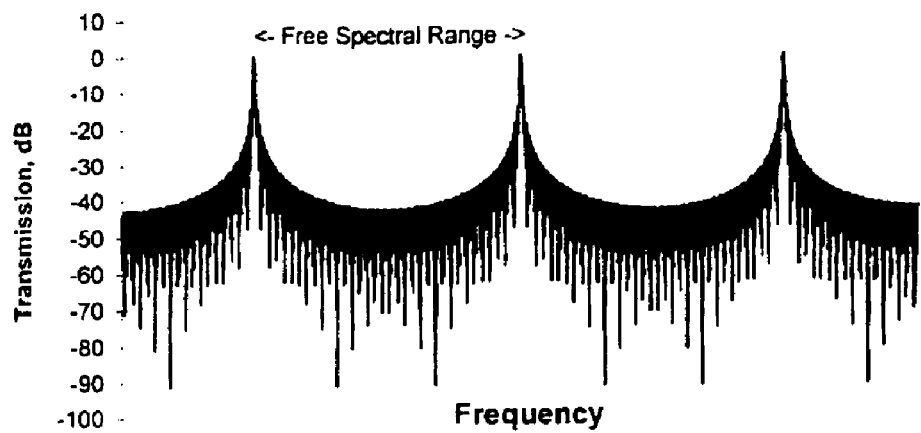
FIG. 2 is a transmission spectrum of a standard AWG.

The spectral response for a standard AWG from one input line to one output line is shown in FIG. 2. The power distribution in the delay waveguides is assumed to be Gaussian, giving a Gaussian-squared power response. The non-infinite rejection between the passbands is due to the finite number of delay lines.

Figure 3:
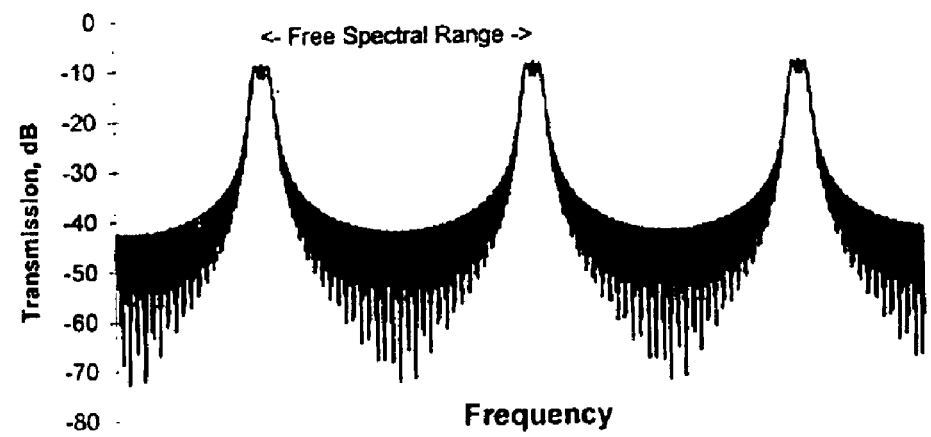
FIG. 3 is a transmission spectrum of the dispersion compensating device.

The spectral response, on the other hand, for the compensation device 2 from one input line 4 to one output line 8 is shown in FIG. 3 for a quadratic phase shift across the delay lines 12. This response shows how the phase shifts broaden the passbands compared to the standard AWG. The response indicates the device 2 can be used for dispersion compensation and also channel selection. The other output lines 8 have an identical response but shifted in frequency. Accordingly, the device can be used for demultiplexing multiple input channels to different output lines 8. The input waveguides 4 need to have a sufficiently wide far field to excite the delay waveguides 12, and as discussed above, the shorter waveguides 12 will only focus the lower optical frequencies on a given output line 8, whereas the longer waveguides will focus the higher frequencies on the output line. The higher frequencies will suffer the greatest delay, compensating for the opposite characteristic in most optical fibres.

The maximum dispersion compensation (s/Hz) is in the order of the square of the differential time delay between adjacent guides 12 multiplied by the square of the number, of guides 12 divided by twice the value of the quadratic phase shift across all of the guides. To increase the dispersion requires a reduction in the quadratic phase shift across the waveguides 12, and a reduction in the free spectral range (fsr) of the spectral response.

Figure 4:
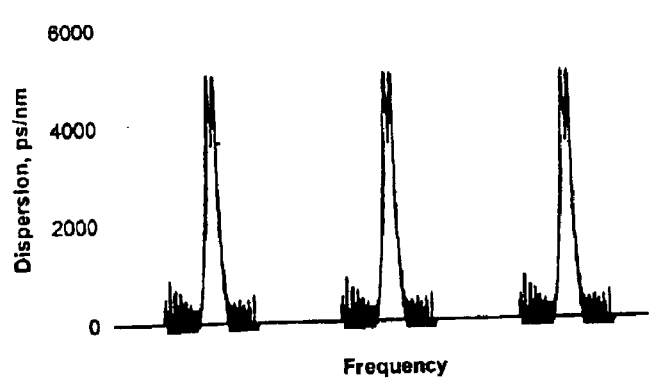
FIG. 4 is a graph of dispersion compensation versus optical frequency for the dispersion compensating device.

A 121 waveguide device 2 with i=121, a Gaussian full width half maximum (FWHM) of 0.5 GHz, an fsr of 200 GHz, and a quadratic phase shift of 2000° between the extreme guides is described below. With this quadratic phase shift the device has a bandwidth of 14 GHz FWHM as shown in FIG. 3, which is close to the minimum for 10 Gbit/s transmission. The dispersion compensation (ps/nm) of the device 2 versus frequency is shown in FIG. 4. The device 2 provides a large, but constant, amount of dispersion compensation over its spectral passbands, and thus can be used to compensate a number of wavelength channels. The dispersion compensation is around 4300 ps/1 nm within the passbands. This allows the compensation of 270 km of fibre with a dispersion of 16 ps/nm/km.

Figure 5:
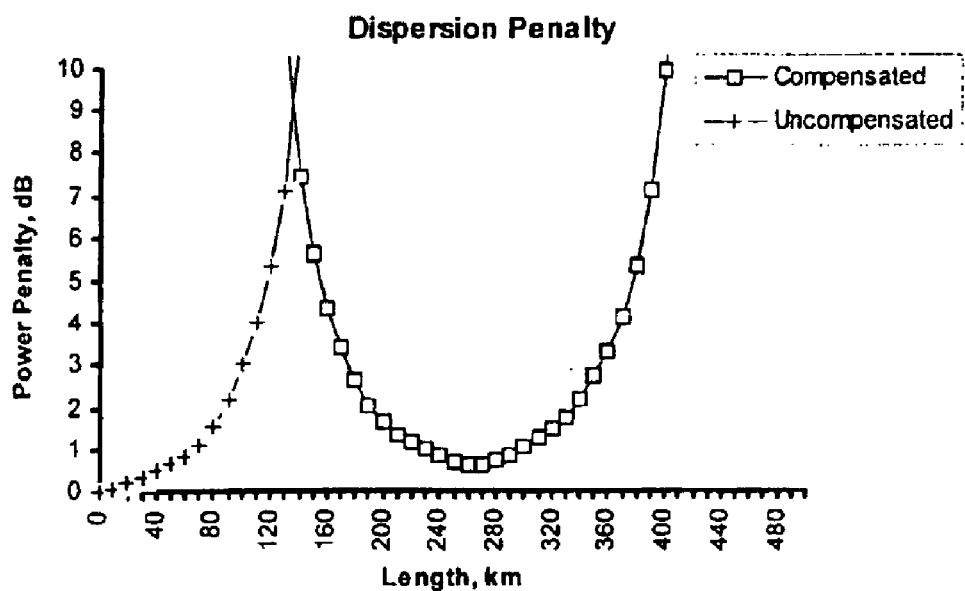
FIG. 5 is a graph of power loss versus optical link length for an optical communication system with and without compensation by the dispersion compensating device.

The effectiveness of the dispersion compensation provided by the device 2 in an optical communication system, using standard single-mode fibre which has a positive dispersion of 16 ps/nm/km at 1550 nm, has been determined using eye closure assessment. The system transmits 10 Gbit/s non-return-to-zero data using an externally-modulated (chirp free) 1550 nm source. Eye closure is a commonly used method of estimating signal quality based on overlapping time-shifted versions of the received optical data waveform so an eye-like pattern is formed. Eye closure is defined as the difference between the worst case zero and one bit signal levels for an imperfect system divided by this difference for a perfect system. It is indicative of the amount of extra power than needs to be received to compensate for the eye closure, however a large power penalty cannot be compensated for by simply increasing optical power as it indicates severe waveform distortion. The power penalty, being the increase in received power required to compensate for dispersion, versus the transmission distance, equal to the length of the fibre of the system, is shown in FIG. 5 for a system compensated by the device 2 and a system without compensation. For the uncompensated system, the power penalty increases as the fibre length is increased and becomes unacceptable (approximately greater than 2 dB penalty) for lengths beyond approximately 90 km. The device 2 allows systems of a far greater length to be used by compensating the dispersion of the fibre as shown in the compensated plot in FIG. 5. For this particular design, the dispersion of 270 km of fibre is compensated for by the device. For shorter systems, the device overcompensates for the fibre's dispersion, leading to a penalty. For longer systems, the device under compensates for the fibre's dispersion, leading to a penalty. However, the penalty is less than 2 dB for a length variation of at least 140 km. This example is for one design of the device 2 and the device can be optimised for a minimum power penalty at other lengths as desired.

Figure 6:
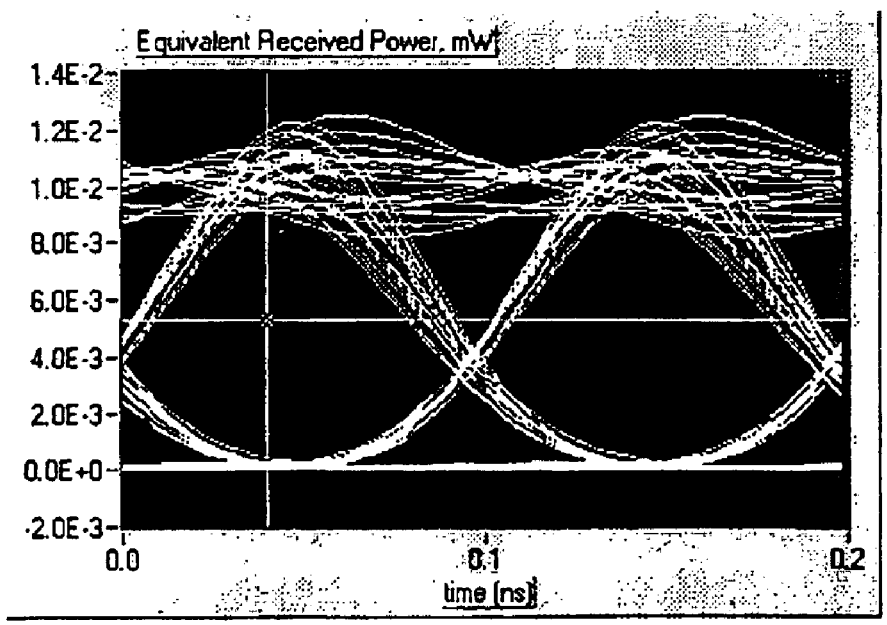
FIG. 6 is an eye diagram for an optical communication system including, the dispersion compensating device.

The eye diagram for the 270 Ian compensated system is shown in FIG. 6, which illustrates that the compensated received optical signal is of a good quality. The eye diagram is almost completely open with <1 dB penalty, and with good differentiation between zero and one bits over a wide range of timings. The power scale in FIG. 6 is arbitrary as optical losses can be compensated for by amplification in the system.

The 121 guide design has differential delays of 5 ps between the guides, and the longest guide provides 600 ps greater delay than the shortest. With Indium-Phosphide circuits (InP) this gives a path length difference of less than 4 cm, equivalent to a semicircle of 1.2 cm radius, and the device can be integrated onto a standard wafer of InP.

The device offers significant advantages over dispersion compensating fibres and fibre Bragg gratings commercially available for dispersion compensation, as it can easily be designed to provide an exact wavelength dependent compensation of dispersion, requires fewer components than for a Bragg grating, and has a lower loss than a dispersion compensating fibre. Furthermore, the device is able to compensate multiple passbands, hence it can compensate multiple channels in a wavelength-division multiplexed (WDM) fibre system. The device can also be designed to simultaneously bandpass filter the WDM channels, and/or provide wavelength routing, as described below. The device can also be used to provide compression of optical pulses for ultra-short pulse generation by adding dispersion to the optical path. Furthermore, the device can-be actively modified, for example by electrooptic or thermal effects.

As the device 2 has a plurality of inputs 4 and plurality of output lines 8 it be used to execute a number of functions for optical communication systems. Some further examples are:

1. With a free spectral range equal to an integer multiple of the input channel spacing, the device can demultiplex the input channels to separate output channels whilst performing dispersion compensation on each channel. This is useful at the end of a high-capacity WDM link to route information.
2. With multiple inputs and a free spectral range equal to a multiple of the channel spacing, the device can serve as a multiplexer and a dispersion (pre-) compensator, for example at the transmitting end of a high-capacity link. The device, as described above, could also simultaneously be used at the end of the link, thus providing twice the amount of dispersion compensation.
3. With N inputs 4 focused on N outputs 8 respectively at a desired channel frequency, the first output can be fed back to the second input, and the second output fed back to the third input, etc., until an output is obtained at the Nth output port. This would give N times the dispersion compensation of a single-pass device. Optical amplifiers can be used in the loop-back paths to compensate for loss in the device and to ensure the signal does not drop below a desirable level.
4. A modification of the device in item 3 above can be obtained by considering that the AWG is a reciprocal device that can be used bidirectionally. Thus the input can be sent to the first input line, and the first output looped back to the second output, to appear at the second input 2, and this can then be fed to the third input and so on. This bidirectional multi-pass device may be easier to integrate onto a signal planar substrate than that of item 3.
5. A reflective device could be placed at any output port to give a multiple-pass structure. Here the input could be fed into any input line 4 and the corresponding output line 8 could be fed to a reflector. The double-pass compensated signal would emerge from the same port as it was input to and an optical circulator can be used to separate the input and output waves to separate physical ports.

Many modifications will be apparent to those skilled in the art without departing from the scope of the present invention as herein described.

What is claimed is:

1. An optical device having:
   a plurality of waveguides;
   an input port coupled to said waveguides such that light incident on said input port is coupled for propagation on each of said waveguides from said input port to an output plane of incidence; and
   an output port receiving light propagated on said waveguides at a point on said output plane of incidence, and outputting said light at said point;
   said waveguides inducing respective delays in light propagated, from said input port to said output port, by introducing at least quadratic-order phase differences between light propagated on said waveguides.

2. An optical device according to claim 1, including m said waveguides, denoted i, Where i=1 to m, and m is a positive integer; and
   wherein delays in said waveguides differ by $ki^n$, where n is an integer greater then one and k is a constant.

3. An optical device according, to claim 2, wherein said waveguides have delays $T=T_0+i\,T_1+i^n\,T_n$, where $T_0$, $T_1$ and $T_n$ are constant delays.

4. An optical device according to claim 3, wherein $T_n=T_1$.

5. An optical device according to claim 4, wherein n=2.

6. An optical device according to claim 4, wherein N=3.

7. An optical device according to claim 1, including m said waveguides, denoted i, where i=1 to m, and m is a positive integer, said waveguides having optical path lengths given by:

$$L=L_0+i\,\Delta L+i^n k$$

where k, $L_0$ and $\Delta L$ are constants and n is an integer greater than one.

8. An optical device according to claim 7, where n=2 for a quadratic phase shift, and n=3 for a phase shift of order at least equal to three.

9. An optical device according to claim 1, wherein said device comprises an arrayed waveguide grating (AWG).

10. An optical device according to claim 9, wherein said device is a planar integrated optical circuit.

11. An optical device having:
- a plurality of optical delay lines;
- an input device to couple incident light from at least one input to each of said optical delay lines for propagation from said input device to an output device; and
- an output device to recombine signals from said delay lines into at least one output;
- wherein said delay lines introduce at least quadratic-order phase differences between light propagated on said delay lines and substantially compensate for dispersion.

12. An optical device according to claim 11, including m said delay lines, denoted i, where i=1 to m, and m is a positive integer, and
- delays in said delay lines differ by $ki^n$, where n is an integer greater than lone and k is a constant.

13. An optical device according to claim 12, wherein said delay lines have delays $T=T_0+l\,T_1+i^n\,T_n$, where $T_0$, $T_1$ and $T_n$ are constant delays.

14. An optical device according to claim 13, wherein $T_n=T_g$.

15. An optical device according to claim 13, wherein n=2.

16. An optical device according to claim 14, wherein n=3.

17. An optical device according to claim 11, including m said delay lines denoted i, where i=I to m, and m is a positive integer, said delay lines having optical path lengths given by:

$$L=L_0+i\,\Delta L+i^n k$$

where k, $L_0$ and $\Delta L$ are constants and n is an integer greater then one.

18. An optical device according to claim 17, where n=2 for a quadratic phase shift, and n=3 for a phase shift of order at least equal to three.

19. An optical device according to claim 10, wherein said device comprises an arrayed-waveguide grating (AWG).

20. An optical device according to claim 19, wherein bald device is a planar integrated optical circuit.

21. An optical device according to claim 11, wherein said input device is an optical splitter.

* * * * *